United States Patent
Kawamura et al.

(10) Patent No.: US 10,302,022 B2
(45) Date of Patent: May 28, 2019

(54) WIRE THROTTLE ADJUSTMENT DEVICE

(71) Applicant: Yamabiko Corporation, Tokyo (JP)

(72) Inventors: Kunimune Kawamura, Tokyo (JP); Kazuhiro Umetani, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 0 days.

(21) Appl. No.: 15/525,753

(22) PCT Filed: Nov. 5, 2015

(86) PCT No.: PCT/JP2015/081120
§ 371 (c)(1),
(2) Date: May 10, 2017

(87) PCT Pub. No.: WO2016/076185
PCT Pub. Date: May 19, 2016

(65) Prior Publication Data
US 2017/0314476 A1 Nov. 2, 2017

(30) Foreign Application Priority Data

Nov. 10, 2014 (JP) ................................. 2014-228254

(51) Int. Cl.
*F02D 11/04* (2006.01)
*F02D 9/08* (2006.01)
(Continued)

(52) U.S. Cl.
CPC .............. *F02D 11/04* (2013.01); *F02B 63/02* (2013.01); *F02D 9/02* (2013.01); *F02D 9/08* (2013.01);
(Continued)

(58) Field of Classification Search
CPC .............................. F02D 11/04; B23D 57/023
See application file for complete search history.

(56) References Cited

U.S. PATENT DOCUMENTS 4,245,713 A * 1/1981 Mochida ................ B60K 31/08
123/398
4,631,983 A * 12/1986 Morisawa ................. F16C 1/18
251/294
(Continued)

FOREIGN PATENT DOCUMENTS

DE 4007239 A1 * 9/1990
DE 19617640 A1 11/1996
(Continued)

OTHER PUBLICATIONS

English Abstract of DE 4007239 A1 of Igarashi, Sep. 27, 1990. (Year: 1990).*
(Continued)

*Primary Examiner* — Vinh Luong
(74) *Attorney, Agent, or Firm* — Withrow & Terranova, PLLC

(57) ABSTRACT

A wire throttle adjustment device 1 for performing open-close adjustment of a throttle valve by pull operation of a wire 2. The wire throttle adjustment device 1 includes an operation member 10 connected to an end part 2A of the wire 2 and configured to perform the pull operation of the wire 2. The operation member 10 includes an action part 11 that is elastically deformable by the pull operation of the wire 2 in a fully-opened state of the throttle valve. The action part 11 includes an elastically-deformable elastic arm part 12 configured to swing together with the operation part 15 and extending from the pivotally-supported part 14, and the end part of the wire 14 is connected to a tip part of the elastic arm part 12.

4 Claims, 3 Drawing Sheets

(51) Int. Cl.
    *F16C 1/18*     (2006.01)
    *F02B 63/02*     (2006.01)
    *F02D 9/02*     (2006.01)
    *F02D 11/02*     (2006.01)
    *G05G 1/04*     (2006.01)
    *G05G 7/10*     (2006.01)

(52) U.S. Cl.
    CPC ............... *F02D 11/02* (2013.01); *F16C 1/18* (2013.01); *G05G 1/04* (2013.01); *G05G 7/10* (2013.01)

(56) References Cited

U.S. PATENT DOCUMENTS

| | | | | |
|---|---|---|---|---|
| 4,776,563 A * | 10/1988 | Pascall | ............. | F02D 11/04 |
| | | | | 123/396 |
| 4,798,185 A * | 1/1989 | Driggers | ............. | A01D 34/90 |
| | | | | 123/400 |
| 4,938,304 A * | 7/1990 | Yamaguchi | ............. | B60K 28/16 |
| | | | | 123/342 |
| 5,142,934 A * | 9/1992 | Persson | ............. | B27B 17/0008 |
| | | | | 30/381 |
| 5,765,445 A * | 6/1998 | Miyata | ............. | G05G 1/04 |
| | | | | 56/DIG. 18 |
| 6,511,044 B2 | 1/2003 | Kottke et al. | | |
| 6,855,091 B1 * | 2/2005 | Holmes | ............. | F02D 9/1065 |
| | | | | 123/342 |
| 8,051,743 B2 * | 11/2011 | Kullberg | ............. | B27B 17/08 |
| | | | | 123/398 |
| 8,739,894 B2 * | 6/2014 | Schlauch | ............. | B25F 5/02 |
| | | | | 123/179.18 |
| 2001/0019118 A1 | 9/2001 | Kottke et al. | | |
| 2006/0137653 A1 * | 6/2006 | Amend | ............. | F02D 11/02 |
| | | | | 123/400 |

FOREIGN PATENT DOCUMENTS

| | | |
|---|---|---|
| EP | 1222847 A2 | 7/2002 |
| JP | H02-118144 U | 9/1990 |
| JP | H04-137230 U | 12/1992 |
| JP | 10-313680 * | 12/1998 |
| JP | 2001289065 A | 10/2001 |
| JP | 2013066398 A | 4/2013 |
| JP | 2013124589 A | 6/2013 |

OTHER PUBLICATIONS

International Search Report and Written Opinion for International Patent Application No. PCT/JP2015/081120, dated Jan, 12, 2016, 11 pages.
International Preliminary Report on Patentability for International Patent Application No. PCT/JP2015/081120, dated May 26, 2017, 9 pages.
Examination Report for European Patent Application No. 15859350. 9, dated Nov. 26, 2018, 3 pages.
Notification of Reasons for Refusal for Japanese Patent Application No. 2014-228254, dated May 29, 2018, 6 pages.
Extended European Search Report for European Patent Application No. 15859350.9, dated Apr. 6, 2018, 6 pages.

* cited by examiner

WIRE THROTTLE ADJUSTMENT DEVICE

This application is a 35 U.S.C. § 371 national phase filing of International Application No. PCT/JP2015/081120, filed Nov. 5, 2015, which claims priority to Japanese Patent Application No. 2014-228254, filed on Nov. 10, 2014, the disclosures of each of which are incorporated herein by reference in their entireties.

TECHNICAL FIELD

The present invention relates to a wire throttle adjustment device configured to perform open-close adjustment of a throttle valve of a carburetor by pull operation of a wire.

BACKGROUND ART

A wire throttle adjustment mechanism is configured to perform open-close adjustment of a throttle valve from an idling state to a fully-opened state by using a wire to pull the throttle valve, which is biased in a closing direction by elastic force of a spring, against the elastic force of the spring. Such a throttle adjustment mechanism has been broadly employed as an output adjustment mechanism in a compact engine-driven handheld or backpack machine (a chain saw, a hedge trimmer, a brush cutter, a blower/vacuum blower, and a sprayer/duster).

This wire throttle adjustment mechanism includes, near a handle or a grip, an operation member configured to pull the wire (a throttle lever, a throttle trigger, etc.). Such an operation member includes a pivotally-supported part that is swingably and pivotally supported on a housing of a holding part, a wire connection part connected to an end part of the wire, and an operation part (a gripping part) configured to swingably operate the operation member about a shaft with, e.g., a finger (see Patent Literature 1 below).

When the throttle lever is operated to adjust opening/closing of the throttle valve via the wire or a cable, an appropriate idling position and an appropriate fully-opened position (a full throttle position) of the throttle valve need to be set within an operation range of the throttle lever. Therefore, in a prior-art case, a position adjustment device is provided at a relay point of the wire, thereby appropriately adjusting an opened/closed position of the throttle valve so as to fall within the operation range of the throttle lever (see Patent Literature 2 below).

CITATION LIST

Patent Literature

[Patent Literature 1] Publication of Japanese Patent Application No. 2013-124589
[Patent Literature 2] Publication of Japanese Patent Application No. 2001-289065

SUMMARY OF INVENTION

Technical Problem

It has been found with regard to wire throttle adjustment mechanisms that repeated use thereof results in stretching of the wire, position displacement between the throttle valve and the operation member, etc., which lead to discordance between an operation state of the operation member and an opened/closed state of the throttle valve, as exemplified by the case where it is impossible to attain a fully-opened state of the throttle valve even by operating the operation member up to an operation limit thereof. For these reasons, it is unavoidable in conventional wire throttle adjustment mechanisms to perform, upon repeated use, maintenance using the position adjustment device provided at the relay point of the wire.

Moreover, upon assembly in mass production of the wire throttle adjustment mechanisms, when there is an individual difference in a wire length, assembly needs, for determining an operation position of the operation member at which the throttle valve is fully opened, to be performed while elaborately adjusting a connection position between the end part of the wire and the operation member. Thus, it takes time to bring an appropriate initial operation state, leading to a problem that a long period of time is required for assembly.

The present invention is provided to cope with such a problem as an example of a technical problem. That is, the present invention is, for example, intended to eliminate the need for maintenance for stretching of a wire, position displacement between a throttle valve and an operation member, etc., to constantly bring an operation state in which the throttle valve is fully opened without employing a complicated position adjustment mechanism, and to promptly initialize, even with an individual difference in a wire length, the operation state in which the throttle valve is fully opened to shorten an assembly time.

Solution to Problem

In order to accomplish the above-described objective, the present invention has the following configuration:

A wire throttle adjustment device for performing open-close adjustment of a throttle valve by pull operation of a wire includes an operation member connected to an end part of the wire and configured to perform the pull operation of the wire. The operation member includes an action part that is elastically deformable by the pull operation of the wire in a fully-opened state of the throttle valve.

Advantageous Effects of Invention

The present invention having the above-described features includes the action part that is elastically deformable by the pull operation of the wire in the fully-opened state of the throttle valve. Thus, even when stretching of the wire, position displacement between the throttle valve and the operation member, etc. are caused, such wire stretching and such position displacement are absorbed by elastic deformation of the action part within an elastic deformation range. Thus, the need for maintenance is eliminated, and an operation state in which the throttle valve is fully opened can be constantly brought without employing a complicated position adjustment device. Moreover, even with an individual difference in the wire length, the operation state in which the throttle valve is fully opened can be promptly initialized, leading to a shorter assembly time.

DESCRIPTION OF EMBODIMENTS

Figure 1:
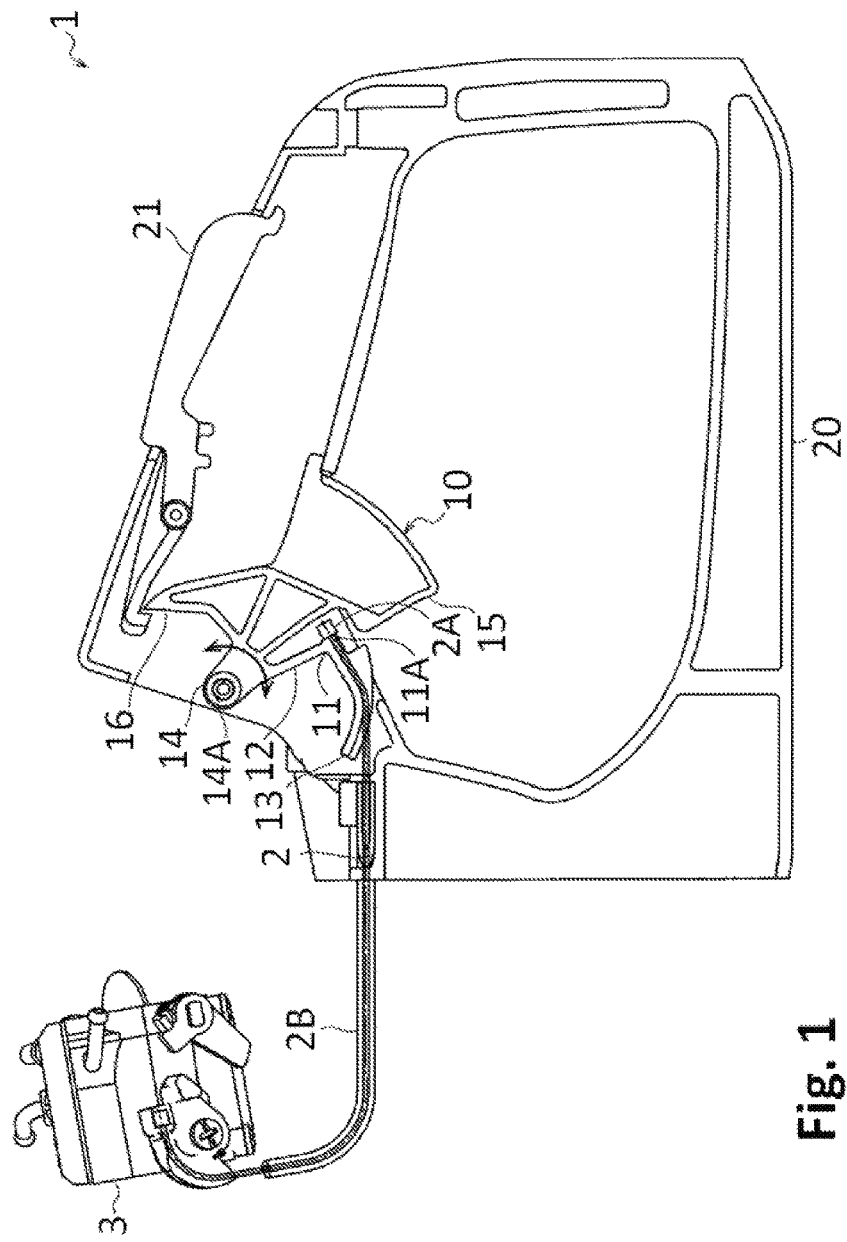
FIG. 1 is a view for describing an entire configuration of a wire throttle adjustment device of an embodiment of the present invention.

An embodiment of the present invention will be described below with reference to drawings. FIG. 1 illustrates an entire configuration of a wire throttle adjustment device of an embodiment of the present invention. A wire throttle adjustment device 1 is configured to perform open-close adjustment of a throttle valve (not shown) of a carburetor 3 by pull operation of a wire 2. Wire throttle adjustment device 1 includes wire 2 and an operation member (a throttle lever) 10. In a basic configuration of wire throttle adjustment device 1, the throttle valve is biased in a closing direction by a not-shown spring, and is operated to open by pulling of wire 2 against elastic force of the spring.

Operation member 10 includes a pivotally-supported part 14 pivotally supported on a frame (a handle frame) 20 forming a handle of, e.g., an engine-driven handheld or backpack machine equipped with wire throttle adjustment device 1. As indicated by an arrow in the figure, operation member 10 is swingably supported about a shaft 14A supporting pivotally-supported part 14. Operation member 10 includes an operation part 15. Fingers holding the handle operate operation part 15 to swingably operate the entirety of operation member 10 about shaft 14A supporting pivotally-supported part 14.

Moreover, operation member 10 includes a locking part 16. In the state in which locking part 16 is locked by a lock lever 21 provided at handle frame 20, the swing of operation member 10 is locked. The locked lock lever 21 is released by grasping of the handle by an operator, and then, is disengaged from locking part 16. In the state in which the operator does not grasp the handle, the throttle valve cannot be operated to open by operation of operation member 10.

Such an operation member 10 includes an action part 11, and an end part 2A of wire 2 is connected to action part 11. Wire 2 is disposed through a wire cover 2B, and extends from an arrangement position of carburetor 3 to a handle position. End part 2A of wire 2 is connected to a tip part 11A of action part 11.

Action part 11 includes an elastically-deformable elastic arm part 12 configured to swing together with operation part 15 and extending from pivotally-supported part 14. End part 2A of wire 2 is connected to a tip part of elastic arm part 12. Moreover, at the tip part of elastic arm part 12, a wire guide 13 configured to guide end part 2A of wire 2 to the tip part of elastic arm part 12 is provided so as to extend around pivotally-supported part 14.

Figure 2:
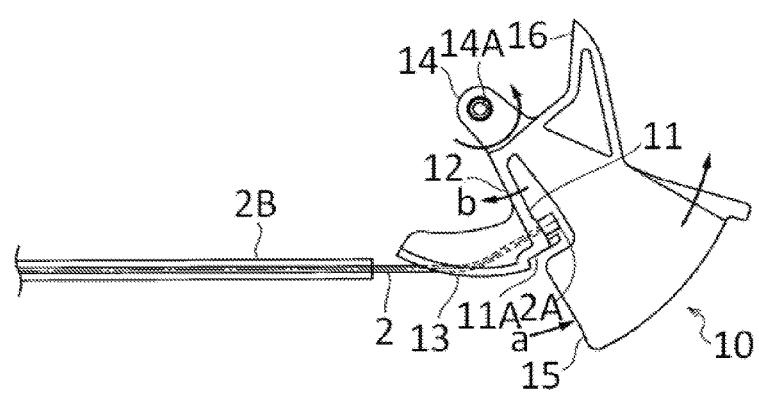
FIG. 2 is a view for describing an adjustment member of the wire throttle adjustment device of the embodiment of the present invention.

The functions of operation member 10 will be described in more detail with reference to FIG. 2. When the fingers operate, in a direction indicated by an arrow a, operation member 10 pivotally supported by shaft 14A, the entirety of operation member 10 including operation part 15 and action part 11 is swingably operated about shaft 14A. In such a state, action part 11 swings together with operation part 15 to pull wire 2, and brings the throttle valve to a fully-opened state. When operation member 10 is further swingably operated in the fully-opened state of the throttle valve, tension of wire 2 elastically deforms action part 11 (elastic arm part 12) in a direction indicated by an arrow b.

With the above-described operation member 10, action part 11 (elastic arm part 12) elastically deforms to relieve the tension of wire 2 before excessive tension is applied to wire 2. Thus, wire 2 can be pulled with constant force regardless of the magnitude of force for operating operation part 15 with the fingers, and therefore, application of the excessive tension to wire 2 can be reduced. Moreover, when engine vibration is transmitted to wire 2 via the throttle valve, such vibration is absorbed by elastic deformation of action part 11 (elastic arm part 12). Thus, action part 11 functions as a damper, and transmission of the engine vibration to the fingers operating operation member 10 can be reduced.

With wire throttle adjustment device 1 including the above-described operation member 10, even when, e.g., stretching of wire 2 or position displacement between the throttle valve and operation member 10 is caused due to repeated use, stretching of wire 2, etc. can be absorbed by elastic deformation of action part 11 (elastic arm part 12) within a range of elastic deformation of action part 11 (elastic arm part 12). Thus, an operation state in which the throttle valve is fully opened can be constantly brought without maintenance such as adjustment of a connection position of the end part of wire 2 and adjustment of the length of wire 2. Note that in this case, an initial operation state needs to be set such that the fully-opened state of the throttle valve is brought before an operation limit of operation member 10. With this configuration, when stretching of wire 2 is caused, the fully-opened state is brought in such a manner that operation member 10 is further operated deeper to the vicinity of the operation limit with respect to an operation position at which an original fully-opened state is brought.

Elastic deformation of operation member 10 effectively functions not only for temporal stretching of wire 2 but also for an individual difference in wire 2 in assembly. That is, even with a certain degree of individual difference in the length of wire 2 in assembly, such an individual difference can be absorbed by elastic deformation of action part 11 (elastic arm part 12). Thus, elaborate initial adjustment for bringing the fully-opened state in an appropriate operation state can be omitted. This allows shortening of an assembly time, and productivity of a machine with which the wire throttle adjustment device 1 is to be assembled can be enhanced.

Wire guide 13 extending from the tip part of elastic arm part 12 is formed such that a groove part configured to guide wire 2 is curved around pivotally-supported part 14. With this configuration, when operation member 10 is swingably operated about shaft 14A, a point at which wire 2 is separated from wire guide 13 is substantially maintained constant. Since such a wire guide 13 extends from the tip part of elastic arm part 12, tension can constantly act on wire 2 in a stable state even when elastic deformation of action part 11 (elastic arm part 12) is caused.

Operation member 10 can be formed of an integrally-molded resin member including action part 11, pivotally-supported part 14, operation part 15, and locking part 16. In this case, the degree of elastic deformation of action part 11 can be optionally set by, e.g., a resin material or shape.

Figure 3:
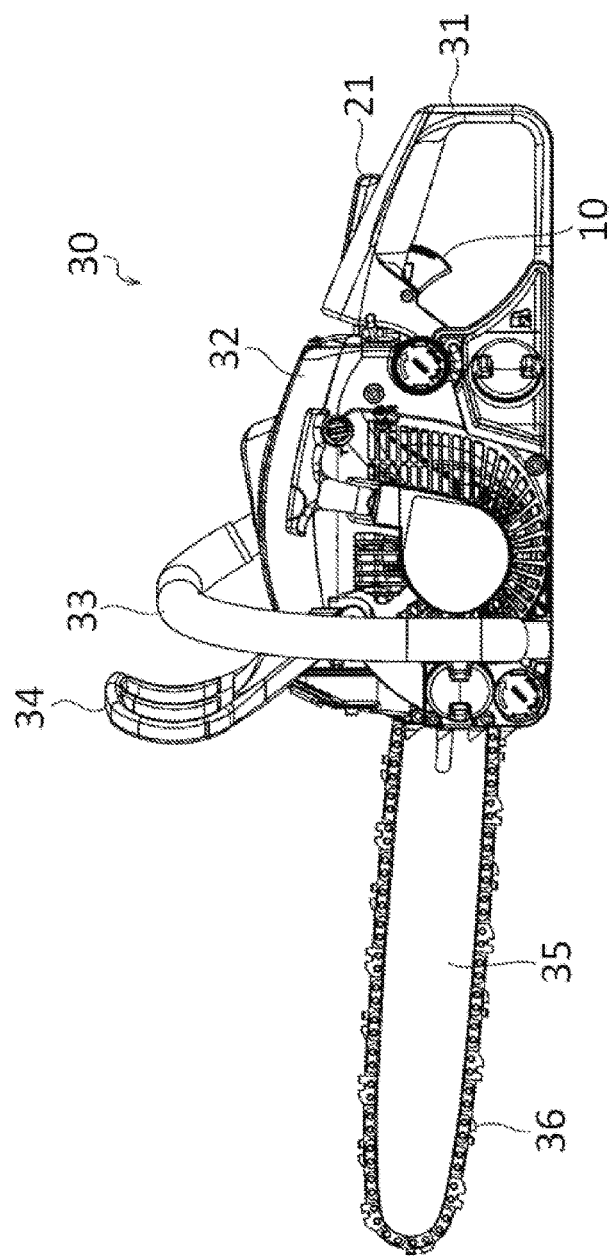
FIG. 3 is a view for describing an example (a chain saw) of an engine-driven handheld machine including the wire throttle adjustment device of the embodiment of the present invention.

FIG. 3 illustrates a chain saw as an example of the engine-driven handheld machine including the wire throttle adjustment device 1. A chain saw 30 includes a handle 31, and operation member (throttle lever) 10 and lock lever 21 of wire throttle adjustment device 1 as described above are attached to a handle frame of handle 31. The illustrated chain saw 30 includes, for example, a main body 32 having an engine (a carburetor), a front bar 33, a brake lever 34, a guide bar 35, and a saw chain 36. Wire throttle adjustment device 1 of the embodiment of the present invention can be employed not only for the illustrated chain saw 30 but also for various engine-driven handheld or backpack machines such as a hedge trimmer, a brush cutter, a blower/vacuum blower, and a sprayer/duster, and can provide the above-described functions.

REFERENCE SIGNS LIST

1 Wire throttle adjustment device
2 Wire

2A End part
2B Wire cover
3 Carburetor
10 Operation member (throttle lever)
11 Action part
11A Tip part
12 Elastic arm part
13 Wire guide
14 Pivotally-supported part
14A Shaft
15 Operation part
16 Locking part
20 Handle frame
21 Lock lever
30 Chain saw (handheld machine)
31 Handle
32 Main body
33 Front bar
34 Brake lever
35 Guide bar
36 Saw chain

The invention claimed is:

1. A wire throttle adjustment device for performing open-close adjustment of a throttle valve by pull operation of a wire, comprising:
   a throttle lever connected to an end part of the wire and configured to perform the pull operation of the wire, wherein
   the throttle lever includes an action part that is configured to elastically deform in response to the pull operation of the wire in a fully-opened state of the throttle valve;
   the throttle lever includes a pivotally-supported part pivotally supported on a handle frame, and an operation part swingably operable about a shaft supporting the pivotally-supported part;
   the action part includes an elastic arm part configured to swing together with the operation part and extending from the pivotally-supported part;
   the end part of the wire is connected to a tip part of the elastic arm part; and
   at the tip part of the elastic arm part, a wire guide configured to guide the end part of the wire to the tip part of the elastic arm part is provided so as to extend around the pivotally-supported part.

2. The wire throttle adjustment device according to claim 1, wherein the throttle lever is configured such that the action part, the pivotally-supported part, and the operation part are integrally molded.

3. An engine-driven handheld or backpack machine comprising: the wire throttle adjustment device according to claim 1.

4. The wire throttle adjustment device of claim 1 wherein the end part of the wire is directly connected to the tip part of the elastic arm part.

* * * * *